United States Patent
El Moursi et al.

(10) Patent No.: US 9,461,573 B2
(45) Date of Patent: Oct. 4, 2016

(54) FAULT HANDLING SYSTEM FOR DOUBLY FED INDUCTION GENERATOR

(71) Applicant: Masdar Institute Of Science And Technology, Abu Dhabi (AE)

(72) Inventors: Mohamed Shawki El Moursi, Abu Dhabi (AE); Weidong Xiao, Abu Dhabi (AE); Po-Hsu Huang, Abu Dhabi (AE)

(73) Assignee: Masdar Institute of Science and Technology, Abu Dhabi (AE)

( * ) Notice: Subject to any disclaimer, the term of this patent is extended or adjusted under 35 U.S.C. 154(b) by 450 days.

(21) Appl. No.: 13/869,235

(22) Filed: Apr. 24, 2013

(65) Prior Publication Data

US 2014/0138949 A1 May 22, 2014

Related U.S. Application Data

(60) Provisional application No. 61/637,493, filed on Apr. 24, 2012.

(51) Int. Cl.
*H02P 9/10* (2006.01)
*F03D 9/00* (2016.01)
*H02H 9/00* (2006.01)
*H02P 9/00* (2006.01)

(52) U.S. Cl.
CPC ............... *H02P 9/10* (2013.01); *F03D 9/003* (2013.01); *H02P 9/007* (2013.01); *H02P 29/032* (2016.02); *Y02E 10/725* (2013.01)

(58) Field of Classification Search
CPC ........ H02P 9/007; H02P 9/10; H02P 29/028; F03D 9/003; Y02E 10/725

USPC ........................................................ 361/52
See application file for complete search history.

(56) References Cited

U.S. PATENT DOCUMENTS

| 7,414,331 | B2 * | 8/2008 | Datta | H02M 1/12 307/54 |
| 2008/0093853 | A1 * | 4/2008 | Barker | H02P 9/007 290/44 |
| 2013/0249501 | A1 * | 9/2013 | Lu | F03D 7/0224 322/21 |

* cited by examiner

Primary Examiner — Thienvu Tran
Assistant Examiner — Kevin J Comber
(74) Attorney, Agent, or Firm — Grossman Tucker Perreault & Pfleger, PLLC

(57) ABSTRACT

Fault Ride Through (FRT) transient management system configured to enhance the FRT capability doubly-fed induction generator (DFIG)-based wind turbines. A grid side converter (GSC) introduces shunt and series compensation for normal operation and voltage dips, respectively. A braking resistor may be added to smooth switching transients from shunt to series interfaces and dissipate excessive power from the GSC. To attain a flexible control solution for balanced and unbalanced fault conditions, the transient management scheme may employ positive and negative sequence controllers. The system dynamics for the series compensation topology may be analyzed using small-signal linear model. Based on the mathematical model, the controller may be tuned to balance voltage regulation performance and transient stability margins with consideration of various operating conditions. The system benefits from a low component count, simple protection structure, and improved FRT performance with effective compensation to the electric grid.

18 Claims, 18 Drawing Sheets

FIG. 18

TABLE I
DYNAMIC RESISTANCE IN DIFFERENT OPERATING POINTS

| Rotor speed (pu) | $I_s$ (pu) | $V_c$ (pu) | $r_a$ (pu) |
|---|---|---|---|
| 1.2 (Super-synchronous) | 0.8-1 | 0.1-1 | 0.1-1.25 |
| 1.1 (Super-synchronous) | 0.6 | 0.1-1 | 0.167-1.667 |
| 1.0 (Synchronous) | 0.4 | 0.1-1 | 0.25-2.5 |
| 0.9 (Sub-synchronous) | 0.3 | 0.1-1 | 0.33-3.33 |
| 0.8 (Sub-synchronous) | 0.2 | 0.1-0.8 | 0.5-4 |

TABLE II
PARAMETERS OF STABILITY IN DIFFERENT OPERATING POINTS

| $r_g$ (pu) | Phase Margin | Cross Frequency (krad/s) | Gain Margin |
|---|---|---|---|
| 4 | 41.8° | 10.9 | ∞ |
| 2 | 74.1° | 7.67 | ∞ |
| 1 | 95.7° | 3.31 | ∞ |
| 0.6 | 96.8° | 2.06 | ∞ |
| 0.2 | 89.2° | 0.772 | ∞ |

TABLE III
SYSTEM PARAMETERS

| Generator Data (each Turbine) | | Shunt connection | |
|---|---|---|---|
| Rated apparent power | 1.667 MVA | Coupling inductor | 0.3 pu |
| | | Coupling resistor | 0.003 pu |
| Rated power | 1.5 MW | Series connection | |
| Rated voltage | 575 V | Filter inductor | 0.2 mH |
| Rated frequency | 60 Hz | Filter capacitor | 500 µF |
| Stator resistance | 0.0023 pu | Damping resistor | 3 pu |
| Stator inductance | 0.18 pu | Cable Data (5km) | |
| Mutual inductance | 2.9 pu | Resistance | 0.11 Ohms/km |
| Rotor resistance | 0.016 pu | Inductance | 1e-3 H/km |
| Rotor inductance | 0.16 pu | Capacitance | 1e-8 F/km |
| | | Series Transformer | 575V/575V |
| Grid Side Converter | | Rated apparent power | 1.667 MVA |
| Maximum apparent power | 0.6 MVA | Others | |
| Dc-link voltage | 1200 V | Wind speed | 13m/s |
| Dc-link capacitor | 10 mF | SCR | 3 |

FAULT HANDLING SYSTEM FOR DOUBLY FED INDUCTION GENERATOR

PRIORITY

This U.S. Non-Provisional Patent Application claims priority to U.S. Provisional Patent Application No. 61/637,493 entitled "FAULT HANDLING SYSTEM FOR DOUBLY FED INDUCTION GENERATOR" that was filed on Apr. 24, 2012, the contents of the above-identified provisional application being incorporated herein, in entirety, by reference.

TECHNICAL FIELD

The present application relates to fault handling in grid-connected systems, and more particularly, to fault handling in a doubly fed induction system that is connected to a power grid.

BACKGROUND

Wind power is growing at a fast pace worldwide. The Doubly-Fed Induction Generator (DFIG) is widely adopted in wind turbines because of its variable speed operational capability, low operating noise, mechanical stress mitigation, and control flexibility for active and reactive power. Fault ride-through (FRT) capability is essential for power grid-connected DFIG-based wind generation to permit continued operation through severe grid voltage disturbances. Even if faults are far away from the turbine, serious voltage dips could be induced at the connection point. According to recent grid codes, large wind farms should stay connected to High Voltage (HV) grids when faults occur, since disconnection may further degrade voltage restoration during and after fault conditions.

In DFIGs, the rotor windings are connected to the grid via back-to-back converters that control the rotor current and inject current into the grid. The system is sensitive to grid disturbances since the stator winding connects to the grid and rapid change of stator voltage "traps" flux, leading to large induced voltage in the rotor windings at rotational frequency. Therefore, proper protection schemes and FRT techniques are necessary in order to withstand grid faults. Active "crowbars" are commonly utilized to protect the rotor-side converters (RSC) against voltage and current transients caused by voltage dips in the stator side by shorting the rotor winding. When the crowbar is engaged during a fault, the DFIG behaves like an induction machine since the rotor winding is short-circuited by shunt resistors and the RSC is disabled. An obvious drawback of employing the crowbar that the DFIG consumes reactive power and might worsen the grid voltage during the faults. Series dynamic resistors (SDR) may also be utilized to restrain significant rotor currents so that the RSC and rotor circuits can be effectively protected by way of coordination control of the chopper resistor and the crowbar. However, if the wind farm is connected to a weak power network, employing such techniques makes the DFIG unable to supply substantial amounts of reactive power and increases the chance of system instability. Static synchronous compensators (STATCOMs) have also been proposed to supply additional reactive power and compensate for DFIG consumption, but STATCOMs may be inadequate to prevent the system from either rotor overcurrent or dc-link overvoltage. To achieve full system protection, STATCOMS are usually combined with other protective elements such as, for example, stator braking resistors and crowbars, which increase system complexity, cost, etc.

Another possible solution to the FRT problem uses a dynamic voltage restorer (DVR) to isolate the DFIG from the connection point in case of voltage dips. The DVR is a voltage source converter (VSC) that is connected to the grid via a series transformer. During grid faults, the DVR compensates for voltage variations, allowing the DFIG to not deviate from normal operation. However, the DVR solution is very costly for full voltage compensation because it requires the VSC to have the same capacity as the DFIG. A series grid-side converter (SGSC) topology has also been proposed. Studies of the SGSC solution show good FRT performance and emphasize the potential of using series compensation topologies for DFIG applications, but dedicated SGSC converters also increase system complexity and result in higher system cost.

BRIEF DESCRIPTION OF THE DRAWINGS

Reference should be made to the following detailed description which should be read in conjunction with the following figures, wherein like numerals represent like parts:

FIG. 18 illustrates example system parameters for a DFIG system consistent with the present disclosure.

Although the following Detailed Description will proceed with reference being made to illustrative embodiments, many alternatives, modifications and variations thereof will be apparent to those skilled in the art.

DETAILED DESCRIPTION

In one embodiment, a grid-side converter (GSC) and transient management scheme using shunt and series grid interface topologies may be introduced to improve FRT capability for DFIG wind turbines. An example system infrastructure may comprise a DFIG wind turbine, an RSC, a GSC, power electronic switches for system reconfiguration, a series braking resistor, a shunt braking resistor, a low-pass LC filter, and a series transformer. For example, upon the occurrence of a fault the GSC may instantaneously switch to a series grid interface, compensate for the voltage, and maintain the stator voltage at its rated value. As a result, the DFIG will not be directly affected by the grid disturbances during balanced or unbalanced voltage dips. The implementation of the braking resistor allows for smooth transition between the shunt and series reconfigurations and prevents transient overcurrent through the series transformer and LC filter. Based on the positive and negative sequence direct-quadrature (dq) reference frames, the transient management scheme may address various types of symmetrical and asymmetrical grid faults. The system dynamics of the series compensation has been investigated and may be represented by a small-signal linear model, with which the controller may be properly tuned to balance both voltage regulation performance and transient stability margins with consideration of various operating conditions. Finally, a comprehensive simulation study demonstrates operation of the proposed solution, which includes improved FRT performance and increased transient stability margins for the wind park connected to a weak grid.

DFIG Wind Turbine

Figure 1:
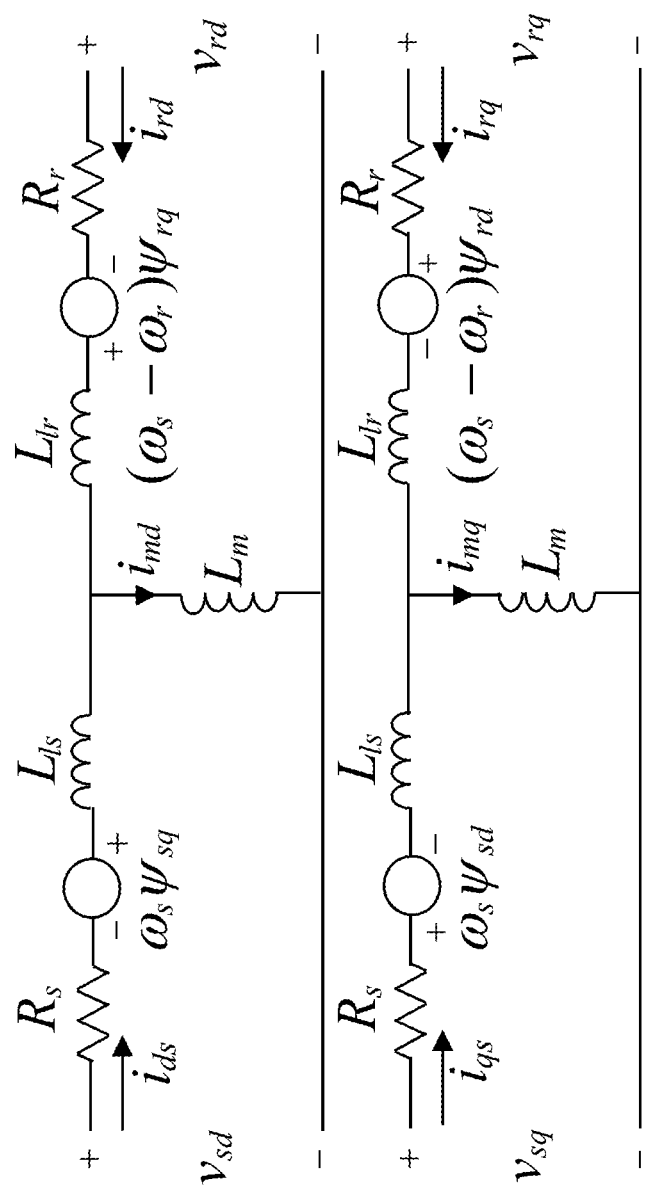
FIG. 1 illustrates an example equivalent circuit of DFIG consistent with the present disclosure.

FIG. 1 discloses mathematical models of an example DFIG that are expressed in equations (1) and (2) in reference to the direct-quadrature (dq) reference frames:

$$\begin{cases} v_{sd} = R_s i_{sd} - \omega_s \psi_{sq} + p\psi_{sd} \\ v_{sq} = R_s i_{sq} + \omega_s \psi_{sd} + p\psi_{sd} \\ v_{rd} = R_r i_{rd} - (\omega_s - \omega_r)\psi_{rq} + p\psi_{rd} \\ v_{rq} = R_r i_{rq} + (\omega_s - \omega_r)\psi_{rd} + p\psi_{rq} \end{cases} \quad (1)$$

$$\begin{cases} \psi_{sd} = L_s i_{sd} + L_m i_{rd} \\ \psi_{sq} = L_s i_{sq} + L_m i_{rq} \\ \psi_{rd} = L_r i_{rd} + L_m i_{sd} \\ \psi_{rq} = L_r i_{rq} + L_m i_{sq} \end{cases} \quad (2)$$

wherein p=d/dt, "s" and "r" refer to the stator and rotor side, "d" and "q" represent the d-axis and q-axis, "Rs" and "Rr" symbolize the resistances of stator and rotor windings, "Ls" and "Lr" are the stator and rotor winding inductances, and Lm" is the mutual inductance.

Figure 2:
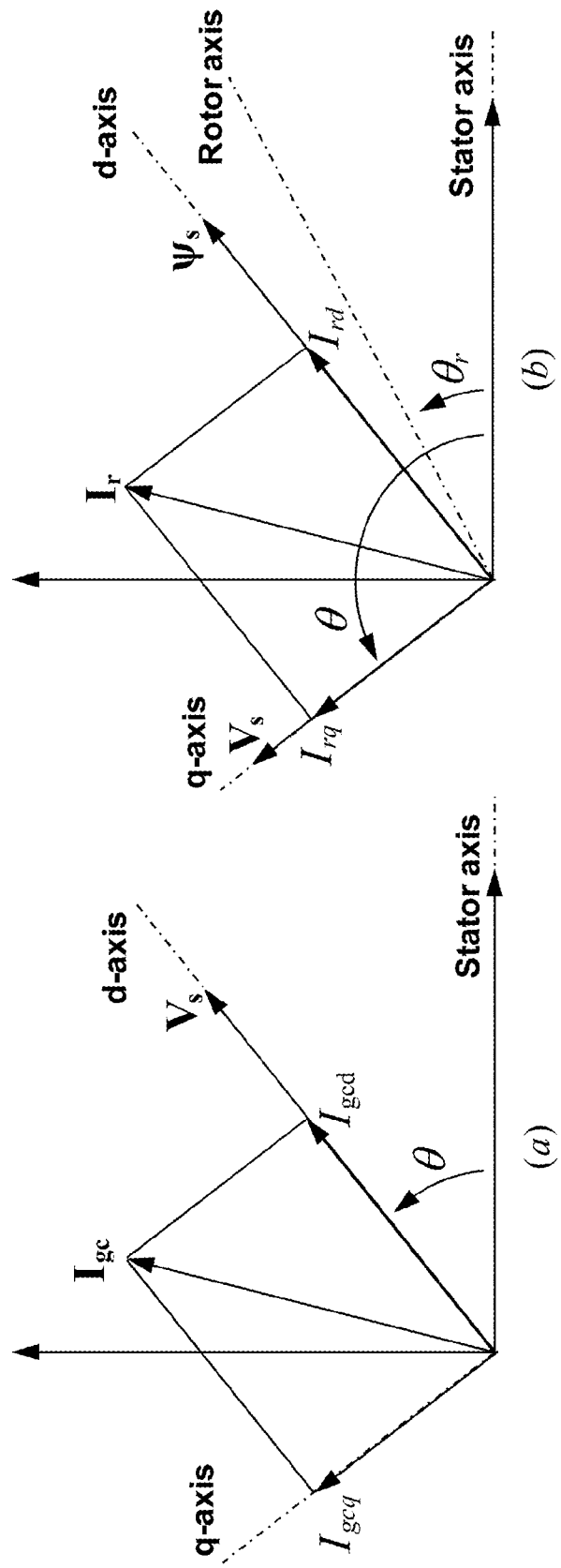
FIG. 2 illustrates an example vectorial diagram in the dq reference frame with stator voltage orientation for the grid side converter current and stator flux orientation for the rotor side converter current consistent with the present disclosure.

The DFIG may use the PWM back-to-back converter to control active and reactive power by decoupled currents. The reference frames of the GSC and RSC are aligned with the stator voltage and the stator flux linkage, respectively. FIG. 2 illustrates an example of the above characteristics. For RSC, the variations in the rotor dq axis current components are directly reflected on their corresponding stator currents, which cause the stator flux linkage "Vsd" to become zero. Example active and reactive power equations that describe this relationship are:

$$\begin{cases} P_s = 1.5 v_{sq} i_{sq} = -1.5 \frac{L_m}{L_s}(v_{sq} i_{rq}) \\ Q_s = 1.5 v_{sq} i_{sd} = 1.5 \frac{v_{sq}}{L_s}(\psi_{sd} - L_m i_{rd}) \end{cases} \quad (3)$$

Thus, the q-axis and d-axis current components may be regulated to control active power and reactive power, respectively. For example, in GSC the reference frame is aligned with the stator voltage, and thus, Vsq is zero. The dc-link voltage that corresponds to the active power is regulated by the d-axis current. The q-axis current may be the control variable that regulates the reactive power supply to the grid.

FRT Configuration

Figure 3:
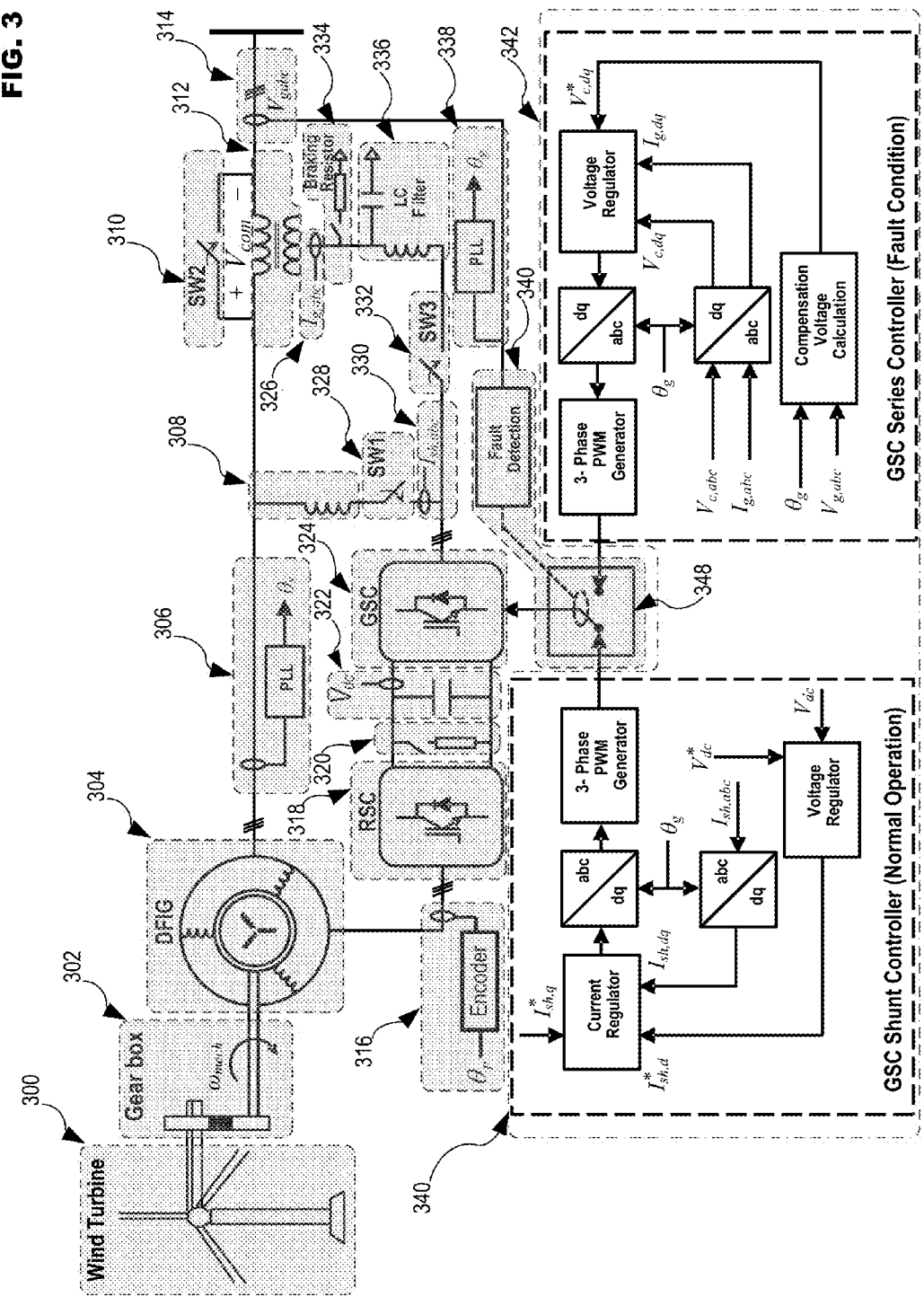
FIG. 3 illustrates an example control diagram for a fault handling for a doubly fed induction generator consistent with the present disclosure.

A DFIG system consistent with the present disclosure is shown in FIG. 3, which comprises a wind turbine 300 coupled via gearbox 302 to DFIG 304. Rotor side converter (RSC) 318 may be coupled to grid side converter (GSC) 324 via chopper series resistor 320 and DC link and voltage measurement system 322. GSC 324 links to grid terminal 314 through shunt or series connections that may be established 'on the fly' by power electronics switches 328, 332 and 310. Example GSC controller configurations for shunt control and series control are illustrated in FIG. 3 at 340 and 342, respectively, may be selected by transition control switch 348. Transition control switch may be controlled by at least fault detection circuitry 340, which receives input from phase locked loop (PLL) measurement and control circuitry 306 and 338. In addition, encoder 316 may be configured to determine rotor position for DFIG 300 and may also provide input usable for system control.

Series transformer 312 may be situated in parallel with switch 310 and connected between the stator side and grid terminal 314 to allow voltage across the transformer to be built up during gird disturbances. Transformer 312 may have a turn ratio of 1:1 and a volt-ampere rating the same as the system. Low-pass LC filter 336 may be connected ahead of transformer 312 to attenuate switching harmonics. Braking resistor and switch 334 may be connected between LC filter 336 and transformer 312 to mitigate any transients that may occur when the series connection is engaged. In one embodiment, the DFIG system illustrated in FIG. 3 may further include inductive filter 308 and current measurement systems with current transformers (C.T) 330 and 326.

Figure 4:
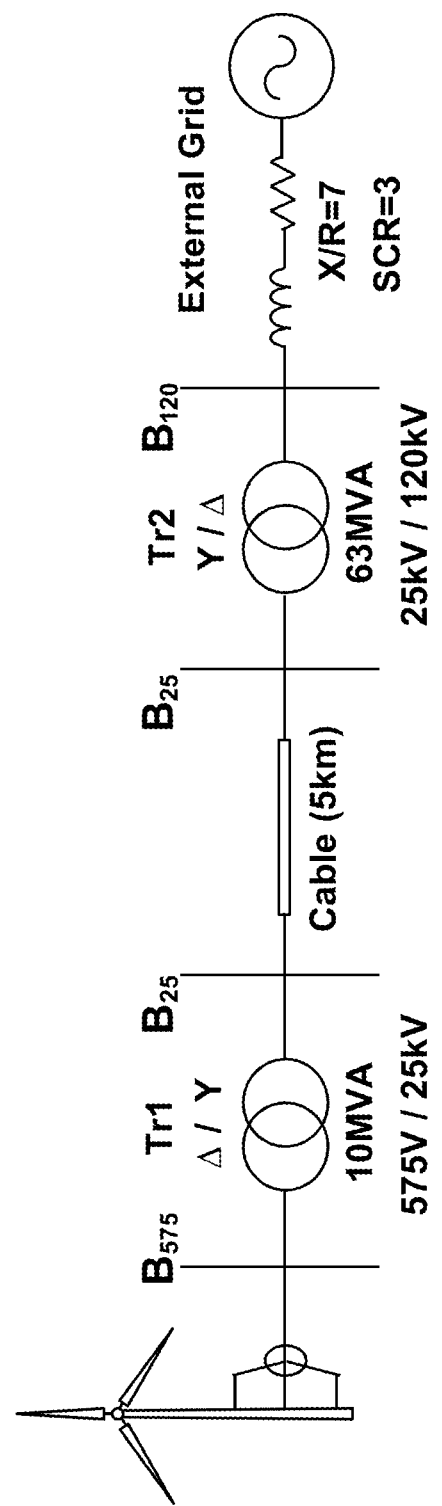
FIG. 4 illustrates an example DFIG wind farm with an external grid consistent with the present disclosure.

FIG. 4 illustrates an example DFIG wind farm with an external grid consistent with the present disclosure. As shown in FIG. 4, the DFIG system terminal may be coupled to step up transformer Tr1 to a middle voltage network that is coupled to the external grid via cables (e.g., 5 km) and another step up transformer Tr2.

Series Injection Topology

In one embodiment, when the DFIG starts operation, the GSC may establish the dc-link voltage via the shunt path by switching on switch 328 (SW1). In normal operation, switch 310 (SW2) is closed to bypass the current through the series transformer and switch 332 (SW3) is open so that GSC 324 is not affected by the series path. When a fault occurs, a voltage dip is induced at grid terminal 314 and may be detected by fault detection circuitry 340. When the fault is confirmed, SW1 and SW2 will be opened and SW3 will be closed to let the current flow through the series path. GSC 324 will switch to the series compensation mode so that voltage deviation between the stator and the grid, Vcom,abc, can be compensated to maintain the stator voltage at the pre-fault condition. GSC 324 may then operate as a voltage source converter (VSC) to regulate the voltage between the stator side and the grid terminal. Since the stator voltage is not affected by the fault, DFIG 300 continues on normal operation and supplies power to grid terminal 314.

Figure 5:
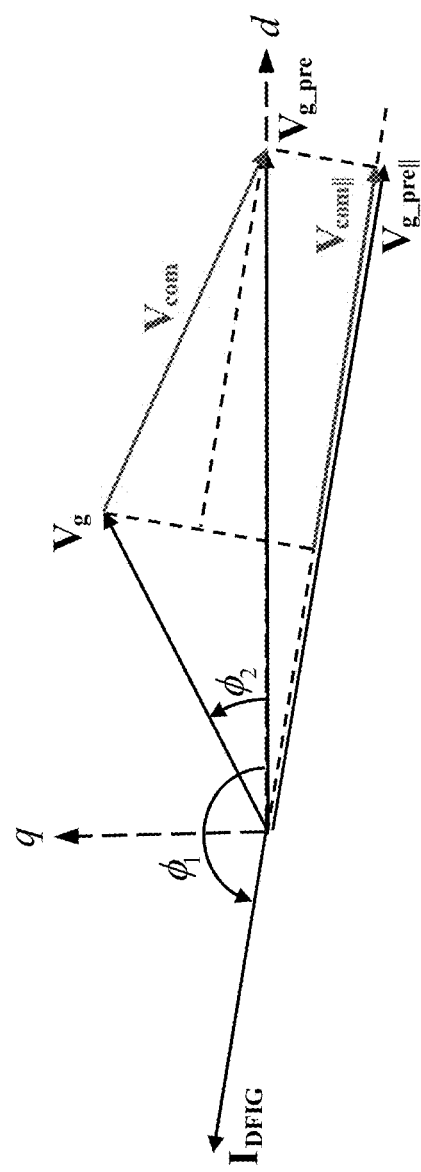
FIG. 5 illustrates a circuit diagram of an example slave module consistent with the present disclosure.

The magnitude of the voltage dip determines how much power is needed by GSC 324 to handle series compensation requirements. During the fault condition, the grid voltage will be roughly as shown in the example phasor diagram as illustrated in FIG. 5, which is based on the pre-fault voltage reference frame. In FIG. 5, $V_{g\_pre}$ and $V_{gpre\|}$ are the pre-fault voltage and its projection on $I_{DFIG}$, and $V_g$ represents the faulty voltage. $V_{com}$ and $V_{com\|}$ correspond to the compensation voltage and its projection, respectively. Considering an example situation where the voltage dips with a phase angle shift, the requirement of active power can be expressed by:

$$P_{series} = \Delta V_{com} P_{DFIG} \quad (4)$$

wherein $\Delta V_{com} = \|V_{com\|}\|/\|V_{g\_pre\|}\|$. In typical DFIG systems, the power rating of GSC 324 is about 20-30% of the total power rating. The worst case scenario may be defined as a situation in which the most serious voltage dip occurs at full power generation. With the series compensation scheme, GSC 324 is required to compensate the full voltage dip and pass through the rated DFIG power.

In super-synchronous operation, both the rotor and stator supply power. The partial amount of power produced by the rotor depends on the slip, which can be shown as $P_r = -sP_s$. During normal operation, the rotor power is supplied to the dc-link through RSC 318, and then injected to the grid through GSC 324. When a fault occurs, the rotor power dissipates on the dc-link shunt resistor (e.g., chopper series resistor 320) since GSC 324 is switched to the series compensation mode. Thus, the stator terminal power is directed to GSC 324 through transformer 312 and dissipated by the dc-link shunt resistor. Consequently, GSC 324 will be subject to the short-period overloading condition, and should be sized for such overload, with such overload capability being common in DFIG systems. Further, full compensation may be achieved by switching on braking resistor 334 to release GSC 324 overloading stress.

The rotor absorbs active power in sub-synchronous speed and normal operation. The power flow is managed by GSC 324 from the stator connection point to the dc-link based on the shunt interface. If a fault occurs, GSC 324 may be switched to the series compensation mode to maintain the dc-link voltage. This condition may be expressed as:

$$P_{series} = \Delta V_{com} P_s \geq P_r = sP_s \quad (5)$$

As shown above, $\Delta V_{com}$ should be larger than the slip so that the power taken from the series path can match the need of the rotor. Therefore, in a situation without the phase jump of the grid voltage, the series compensation topology is not activated if the voltage dip is below the slip value.

Braking Resistor

Braking resistor 334 may be situated between transformer 312 and LC filter 336 to mitigate transients when the system is switched from shunt to series connection. At super-synchronous speed DFIG 300 injects relatively high current to the grid. Any sudden current change in the series path could induce damagingly large voltages across LC filter 336 and transformer 312. Braking resistor 334 may be employed to mitigate the transients by dissipating active power. For example, braking resistor 334 may reduce the power through inductor of LC filter 336 and may reduce the overloading burden of GSC 324. The braking resistor should be properly sized to prevent GSC 324 from supplying additional active power so that the DC-link voltage will not be decreased during the fault. In sub-synchronous speed, the braking resistor will not be activated since the rotor consumes active power, which must be provided by the series compensation during faults. Activating braking resistors may further affect the dc-link voltage and degrade grid voltage restoration after faults.

Figure 6:
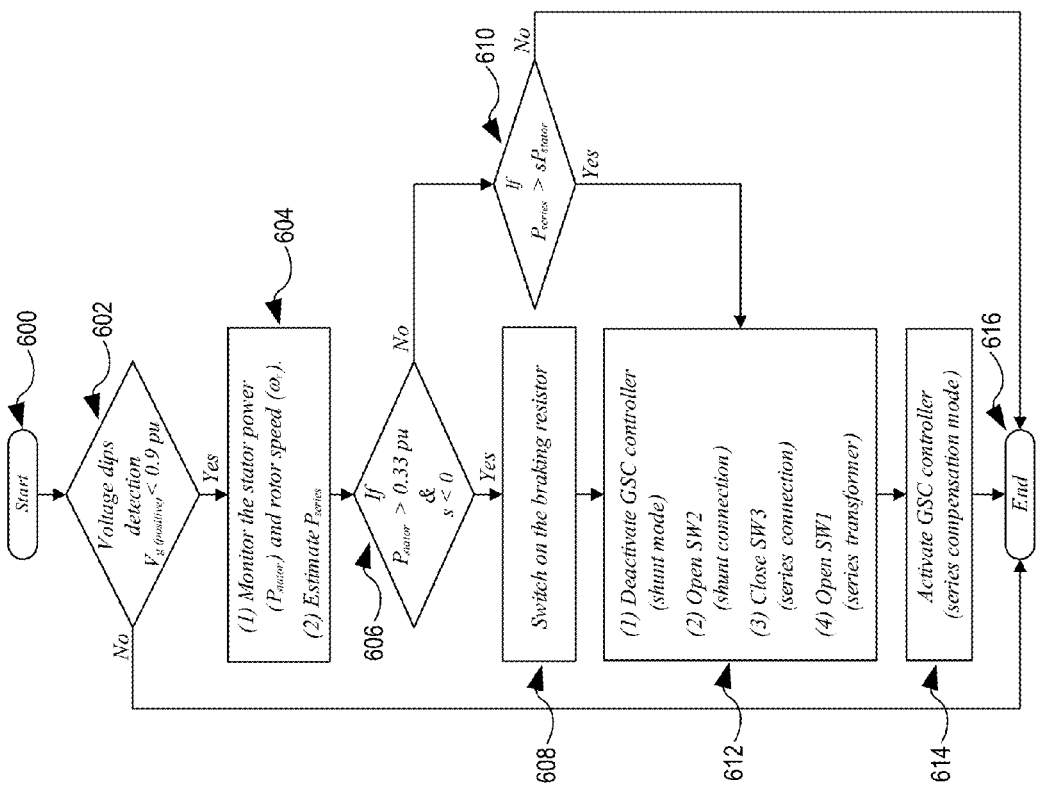
FIG. 6 illustrates a flow chart of operations in an example compensation algorithm consistent with the present disclosure.

A flowchart illustrating operations in an example compensation algorithm consistent with the present disclosure is illustrated in FIG. 6. The procedure may initiate at 600, which may be followed by a voltage detection algorithm in operation 602. If it is determined in operation 602 that no voltage dip is detected, then the algorithm may terminate at 616. If a voltage dip is detected, then in operations 606 the braking resistor may be activated by evaluating the stator power and rotor speed. In particular, a determination may be made in operation 606 as to whether the power of the stator is greater than 0.33 pu and slip (s) is less than 0. If these conditions exist, then the braking resistor may be activated in operation 608. Otherwise, in operation 610 a further determination may be made as to whether series power is greater than the slip*stator power ($sP_{stator}$). If the stator power is determined to be greater, then the algorithm may conclude at 616. Otherwise, the algorithm may progress from operation 608 or 610 to operation 612. In operation 612 the system may deactivate the current operational mode (e.g., deactivate shunt mode in GSC 324 and open SW2), as well as closing SW3 and opening SW1 in preparation for operation 614, wherein a series compensation mode may be activated in GSC 324. The algorithm may then be complete at 616. In sub-synchronous speed operation, the series compensation mode can be skipped by estimating $P_{series}$ to avoid the dc-link voltage from being interrupted by the series interface.

Control of Series Compensation

At least purpose of the series compensation topology is to build up the voltage across the series transformer. GSC 324 becomes a VSC during both balanced and unbalanced faults so that the stator terminal will not be directly affected by the grid disturbances. Using only positive sequence voltage control in the dq reference frame to compensate for voltage dips in a power system is insufficient since unbalanced faults are common. Thus, in at least one embodiment positive and negative sequence control algorithms are utilized to tackle symmetrical and unsymmetrical faults. For example, a control may use both positive and negative sequence loops, of which the sequence components can be obtained by:

$$\begin{bmatrix} v_{a(p,n)} \\ v_{b(p,n)} \\ v_{c(p,n)} \end{bmatrix} = \begin{bmatrix} \frac{1}{3}\left(v_a - \frac{v_b}{2} - \frac{v_c}{2}\right) \pm j\frac{(v_b - v_c)}{2\sqrt{3}} \\ \frac{1}{3}\left(v_b - \frac{v_c}{2} - \frac{v_a}{2}\right) \pm j\frac{(v_c - v_a)}{2\sqrt{3}} \\ \frac{1}{3}\left(v_c - \frac{v_a}{2} - \frac{v_b}{2}\right) \pm j\frac{(v_a - v_b)}{2\sqrt{3}} \end{bmatrix} \quad (6)$$

wherein $v_{a(p,n)}$, $v_{b(p,n)}$ and $v_{c(p,n)}$ are instantaneous positive and negative sequence voltage components, and $v_a$, $v_b$ and $v_c$ are instantaneous voltage values.

Voltage Control

Cascaded voltage and current loops are typically used for VSC voltage regulation in loaded outputs. Decoupled current loops may lead to conflicts between the VSC and DFIG 304 since DFIG 304 shows the characteristics of a controlled current source. Therefore, the inner current loop may be ignored in favor of the voltage controller design for the series compensation.

Figure 7:
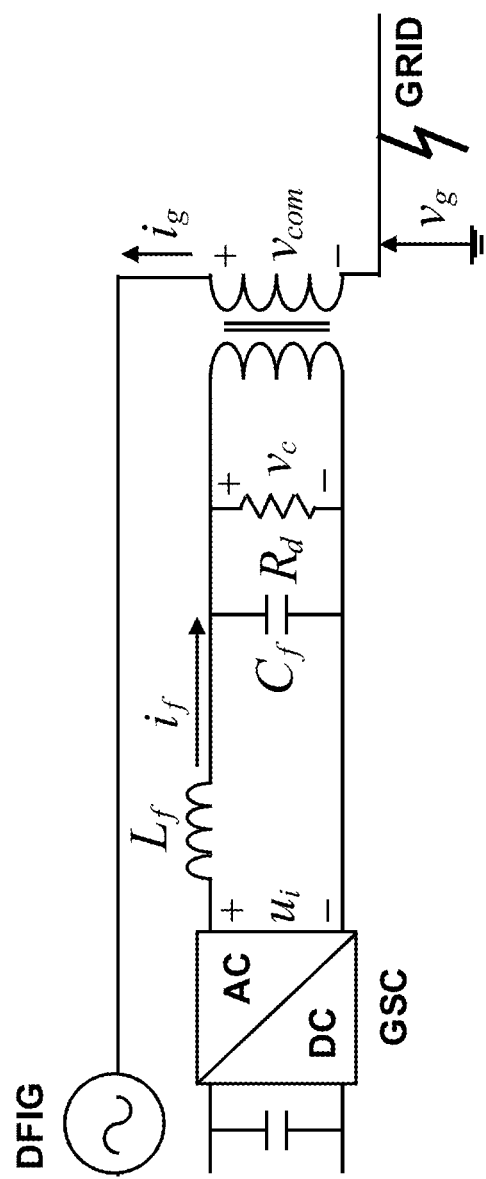
FIG. 7 illustrates an example per-phase diagram of a series connected grid-side converter (GSC) consistent with the present disclosure.

The reference of the compensation voltage across the transformer can be defined as $V^*_{com}=V_{g\_pre}-V_g$, which is disclosed in the example phasor diagram of FIG. 5. An example per-phase diagram of the series connected GSC is illustrated in FIG. 7. To simplify modeling, the series transformer is assumed to be ideal so that $v_{com}$ equals to $v_c$. Therefore, the equations for three-phase series connected circuits in the dq reference frame can be given as:

$$i_{fd(p,n)} = C_f p v_{cd(p,n)} \mp \omega_e C_f v_{cq(p,n)} + v_{cd(p,n)}/R_d + i_{gd(p,n)}$$

$$i_{fq(p,n)} = C_f p v_{cq(p,n)} \pm \omega_e C_f v_{cd(p,n)} + v_{cq(p,n)}/R_d + i_{gq(p,n)} \quad (7)$$

$$u_{id(p,n)} = L_f p i_{fd(p,n)} \mp \omega_e L_f i_{fq(p,n)} + v_{cd(p,n)}$$

$$u_{iq(p,n)} = L_f p i_{fq(p,n)} \pm \omega_e L_f i_{fd(p,n)} + v_{cq(p,n)} \quad (8)$$

Substituting (7) into (8), $$u_{id(p,n)} = L_f C_f p^2 v_{cd(p,n)} + (L_f/R_d) p v_{cd(p,n)} + \quad (9)$$
$$(1 - \omega_e^2 L_f C_f) v_{cd(p,n)} \mp 2\omega_e L_f C_f p v_{cq(p,n)} +$$
$$L_f p i_{gd(p,n)} \mp \omega_e (L_f/R_d) v_{cq(p,n)} \mp \omega_e L_f i_{gq(p,n)}$$

$$u_{iq(p,n)} = L_f C_f p^2 v_{cq(p,n)} + (L_f/R_d) p v_{cq(p,n)} + \quad (10)$$
$$(1 - \omega_e^2 L_f C_f) v_{cq(p,n)} \pm 2\omega_e L_f C_f p v_{cd(p,n)} +$$
$$L_f p i_{gq(p,n)} \pm \omega_e (L_f/R_d) v_{cd(p,n)} \pm \omega_e L_f i_{gd(p,n)}$$

wherein $i_{fd(p,n)}$ and $i_{fq(p,n)}$ are the positive and negative sequence dq components of the inductor current, $v_{cd(p,n)}$ and $v_{cq(p,n)}$ are the positive and negative sequence dq components of the capacitor voltage, $u_{id(p,n)}$ and $u_{iq(p,n)}$ are converter output voltage, $i_{gd(p,n)}$ and $i_{gq(p,n)}$ are grid current, and $\omega_s$ is the grid frequency.

Controller Design

Figure 8:
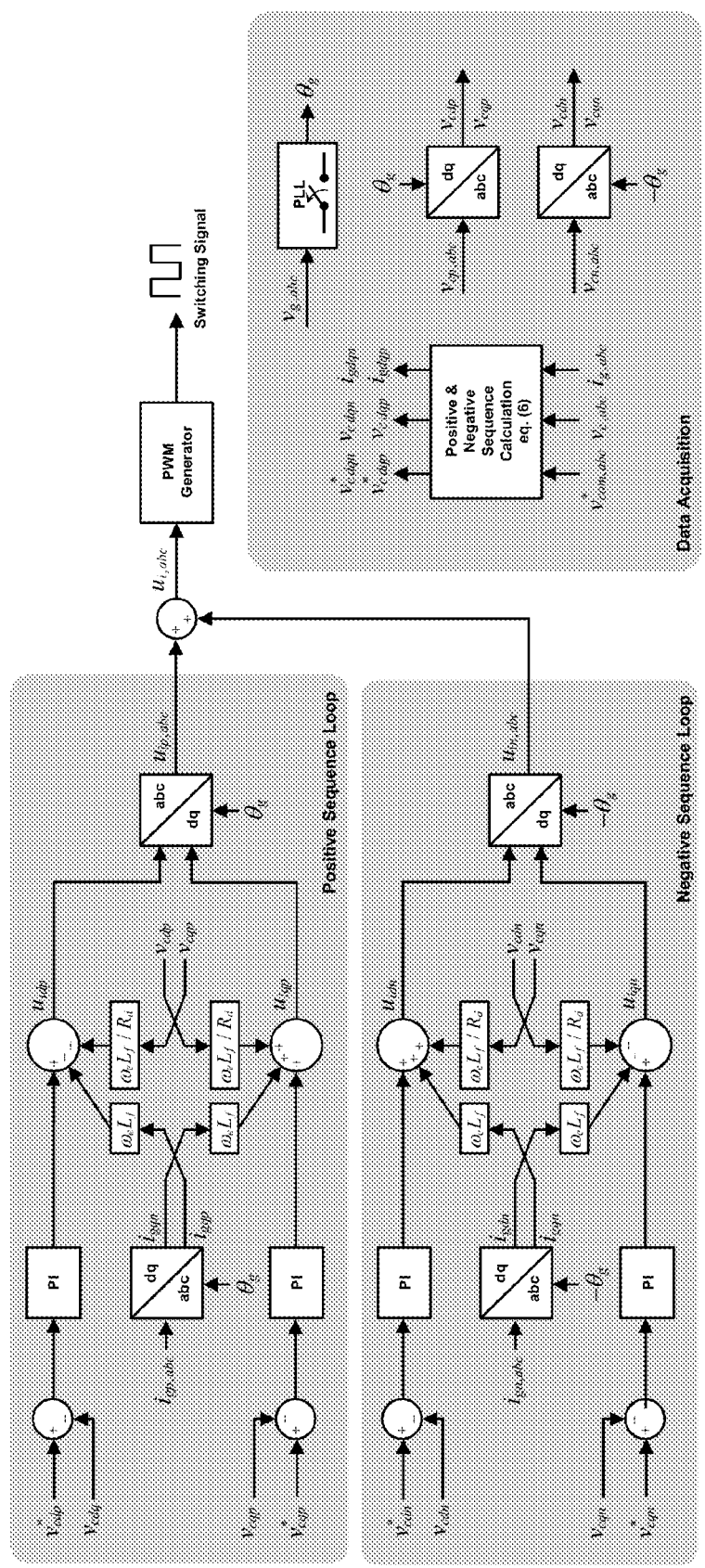
FIG. 8 illustrates an example positive and negative sequence controller for a series-connected GSC consistent with the present disclosure.

FIG. 8 illustrates an example positive and negative sequence controller for a series-connected GSC consistent with the present disclosure. The control diagram is shown in the dq reference frame, indicating both positive and negative sequence control loops. The instantaneous positive and negative voltage and current signals may be obtained from equation (6) above. The PLL may detect the phase angle of the grid voltage so that the d and q components in positive and negative sequence can be obtained in respect to the grid voltage oriented reference frame. The controller output signals may be added together and fed into the PWM generator of example GSC controller configurations 340 and 342 to provide the GSC output reference.

A linearized model may be developed to evaluate the system dynamics and provide the reference for controller tuning. To simply the derivation, the positive sequence d component may be considered first, which may be expressed as follows:

$$\bar{u}_{idp} + \tilde{u}_{idp} = L_f C_f p^2 (\bar{v}_{cdp} + \tilde{v}_{cdp}) + \quad (11)$$
$$(L_f/R_d) p (\bar{v}_{cdp} + \tilde{v}_{cdp}) + (1 - \omega_e^2 L_f C_f)(\bar{v}_{cdp} + \tilde{v}_{cdp}) -$$
$$2\omega_e L_f C_f p (\bar{v}_{cqp} + \tilde{v}_{cqp}) + L_f p (\bar{i}_{gdp} + \tilde{i}_{gdp}) - d$$

wherein $\tilde{u}_{idp}$, $\tilde{v}_{cdp}$, and $\tilde{i}_{gdp}$ correspond to small signal perturbations. The coupling term from the q components is shown as $d_{fp}$ that may be expanded as $d=\omega_e(L_f/R_d)\bar{v}_{cqp}+\omega_e L_f \bar{i}_{gqp}$. At a certain operating point, equation (11) above may be linearized as a small signal model:

$$\tilde{u}_{idp} = L_f p^2 \tilde{v}_{cdp} + (L_f/R_d) p \tilde{v}_{cdp} + (1 - \omega_e^2 L_f C_f) \tilde{v}_{cdp} - 2\omega_e L_f C_f p \tilde{v}_{cqp} + L_f p \tilde{i}_{gdp} \quad (12)$$

A dynamic resistor $r_g$ may be introduced as the division of $\tilde{v}_{cdp}$ and $\tilde{i}_{gdp}$. Table I (illustrated in FIG. 18) includes resistance values corresponding to different operating conditions. The small-signal mathematical model may be represented in s-domain as:

$$\tilde{u}_{idp}(s) = L_f C_f s^2 \tilde{v}_{cdp}(s) + (L_f/R_d + L_f/r_g) s \tilde{v}_{cdp}(s) - (2\omega_e L_f C_f) s \tilde{v}_{cqp}(s) + (1 - \omega_e^2 L_f C_f) \tilde{v}_{cdp}(s) \quad (13)$$

Since $(L_f/R_d+L_f/r_g) \gg 2\omega_e L_f C_f$, the first order coupling term can be neglected. Thus, $$G_{dp}(s) = \frac{\tilde{v}_{cdp}(s)}{\tilde{u}_{idp}(s)} = \frac{1}{L_f C_f s^2 + (L_f/R_d + L_f/r_g) s + (1 - \omega_e^2 L_f C_f)} \quad (14)$$

Figure 9:
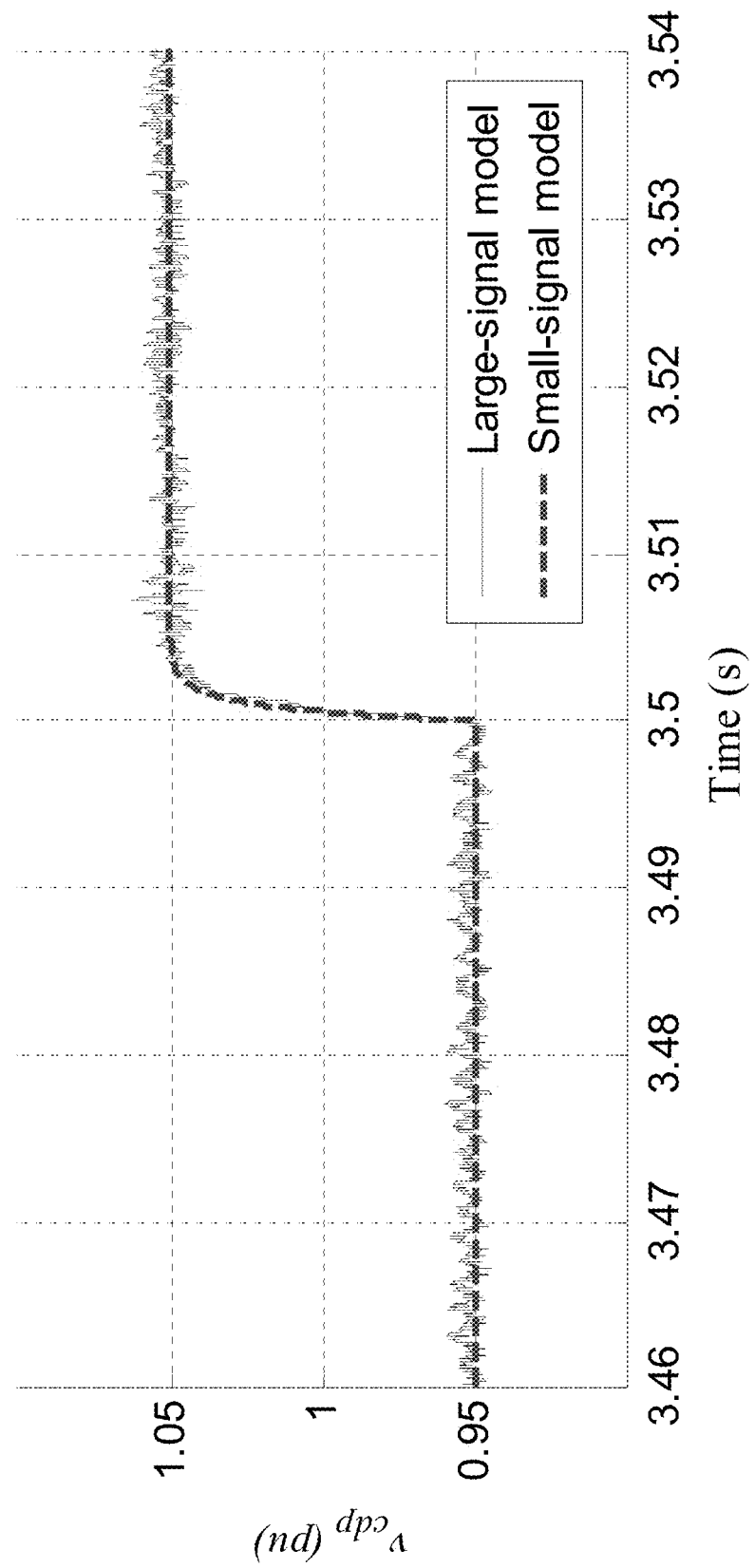
FIG. 9 illustrates an example open loop step-response of a series-connected GSC consistent with the present disclosure.
Figure 10:
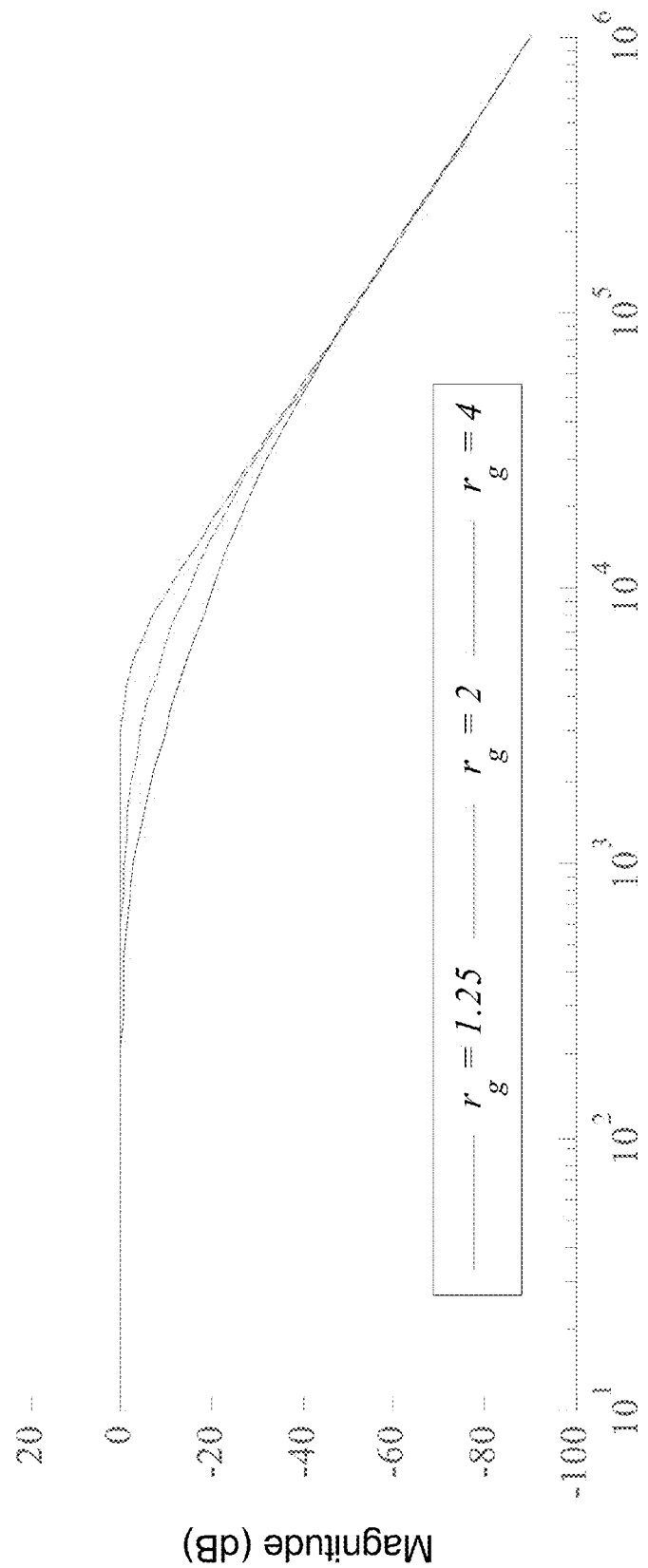
FIG. 10 illustrates an example bode diagram of the system open loop consistent with the present disclosure.
Figure 11:
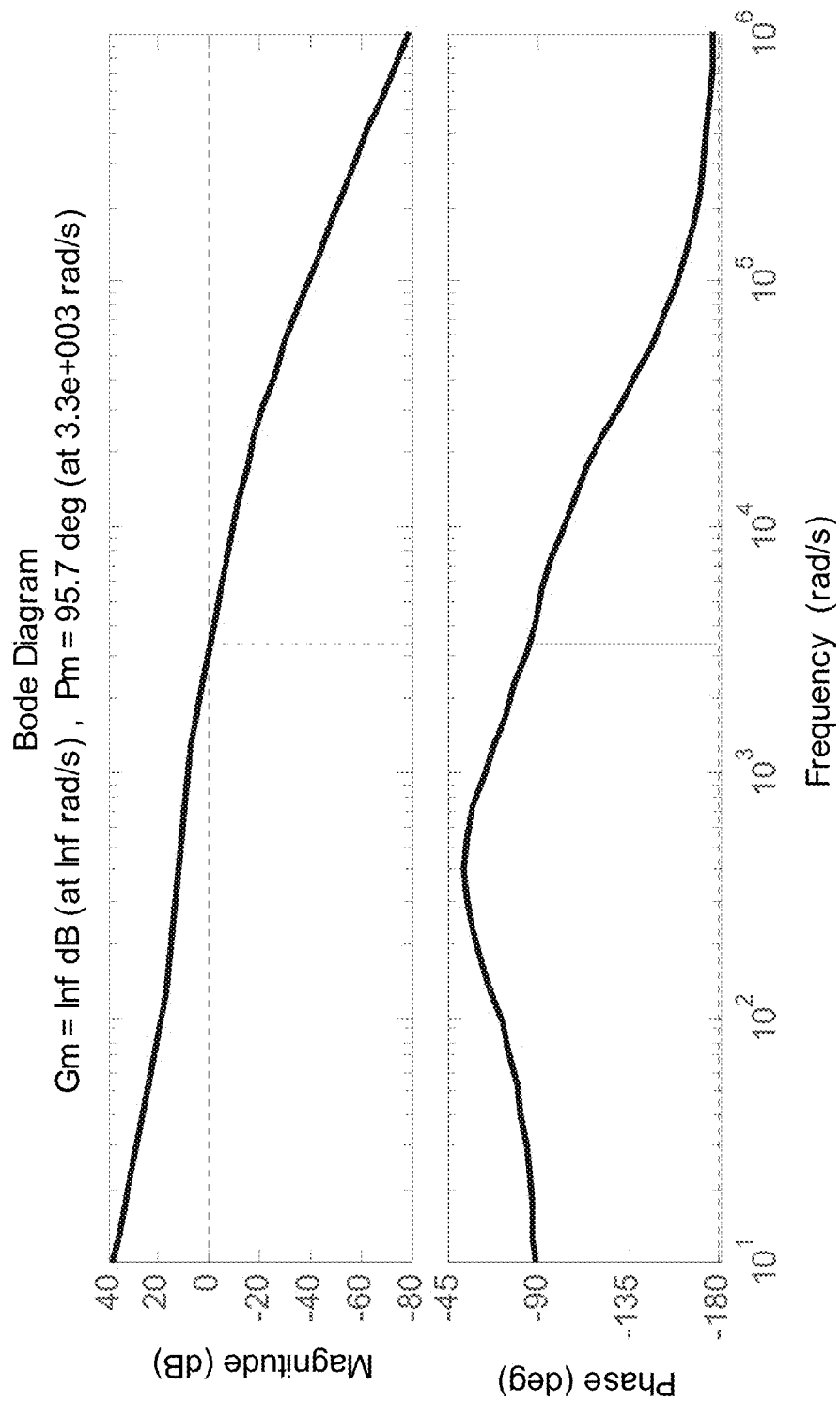
FIG. 11 illustrates an example bode diagram of the controller response consistent with the present disclosure.

The above example model may be validated through a comparison study with the large signal simulation model. FIG. 9 illustrates an example of matched performance between the step response of the simulation model and that of the linearized model. As shown in equation (14) above, the dynamic resistance affects the system damping characteristics and the transfer function. As illustrated in FIG. 10, the model indicates that the system becomes lightly damped when $r_g=4$ as compared with the dynamics when, for example, $r_g=0.2$. Thus, the controller synthesis may provide proper closed-loop stability margins that help guarantee stable and robust operation. The controller may be represented in dq frame as follows:

$$u_{id(p,n)} = (k_p + k_i/s)(v^*_{cd(p,n)} - v_{cd(p,n)}) \pm d_{1(p,n)} \quad (15)$$

$$u_{iq(p,n)} = (k_p + k_i/s)(v^*_{cq(p,n)} - v_{cq(p,n)}) \pm d_{2(p,n)} \quad (16)$$

wherein $d_{1(p,n)}$ and $d_{2(p,n)}$ are considered to be disturbances that may be expressed as $d_{1(p,n)}=(1-\omega_e^2 L_f C_f)v_{cd(p,n)}+\omega_e(L_f/R_d)v_{cq(p,n)}+\omega_e L_f i_{gq(p,n)}$, $d_{2(p,n)}=(1-\omega_e^2 L_f C_f)v_{cq(p,n)}+\omega_e(L_f/R_d)v_{cd(p,n)}+\omega_e L_f i_{gd(p,n)}$, and $k_p$ and $k_i$ are proportional and integral gains of the controller. The bode diagram illustrated in FIG. 11 indicates the phase margin at the condition $r_g=1$. The controller is tuned with $k_p=4$ and $k_i=800$. Given this configuration, the phase margin of $C(s) G_{dp}(s)$ under different operating conditions are evaluated in Table II as illustrated in FIG. 18. In this example, the phase margin is above 40 degrees in the most lightly-damped case. The relative stability margins indicate a robust feedback control system.

Evaluation

The effectiveness of various embodiments disclosed herein may be verified through SimPowerSystem®, Simulink®, etc. The short circuit ratio (SCR) and X/R ratio of the external grid are defined as 3 and 7, respectively, to simulate the DFIG system in a weak power network. Example system parameters are disclosed in Table III as illustrated in FIG.

Figure 12:
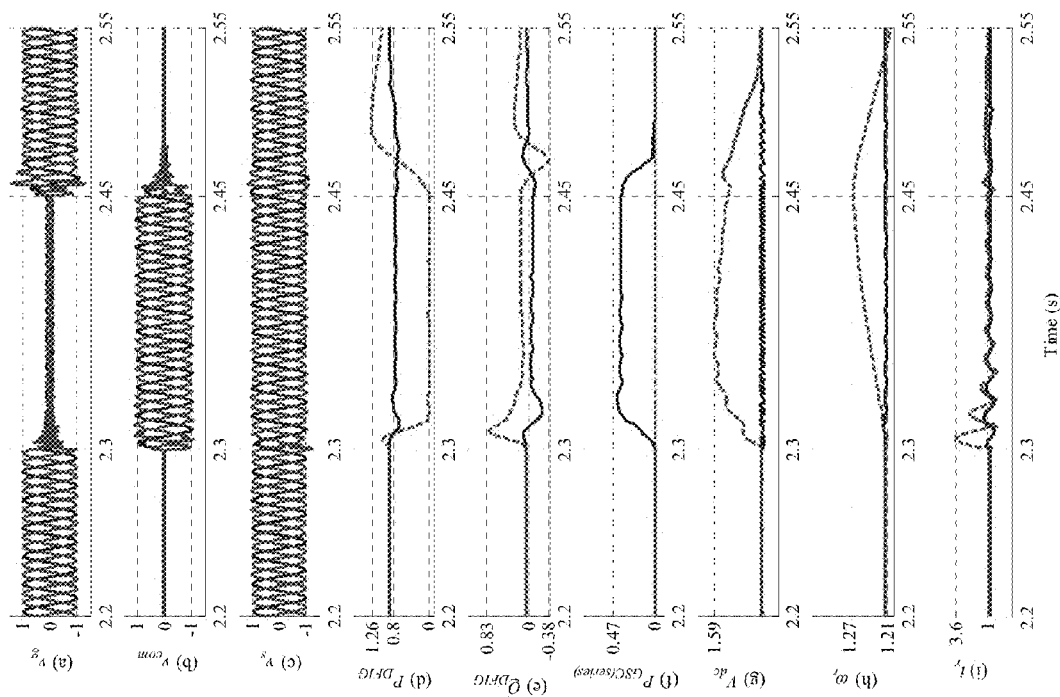
FIG. 12 illustrates various example simulation results of a series compensation topology compared with the case without a protection scheme during three phase voltage dips consistent with the present disclosure.

18. To demonstrate improvement, the simulation results are compared to a conventional DFIG system configuration. FIG. 12 illustrates example results graphs (a) to (i) given the occurrence of three-phase voltage dips of 150 ms duration at point of coupling (PCC). Without compensation, a high rotor voltage and rotor current will be induced due to the speed voltage and the large fault current in the stator. The rotor current jumps to 4 pu following the voltage dips, as shown in FIG. 12 graph (i). This is unacceptable since the overcurrent might damage the rotor side converter and rotor circuit. The high rotor current flows through the RSC and raises the dc-link voltage to 1.4 pu. Moreover, the stator voltage dips, making the simulated DFIG unable to supply active power to the grid. The rotor speed accelerates up to the speed of 1.27 pu due to the lack of power evacuation to the grid.

When series compensation consistent with the present disclosure is applied, as shown in FIG. 12 graph (c), the stator terminal voltage may be maintained to avoid voltage drop. Since the simulated GSC has been switched to the series compensation mode, the rotor power in super-synchronous speed is delivered to the dc link, wherein the dc-link voltage is regulated by the chopper resistor, as shown in FIG. 12 graph (g). The DFIG stator power is transmitted to the GSC through the series transformers. Meanwhile, the braking resistor is activated to mitigate the overload power of the simulated GSC. As shown in FIG. 12 graph (f), the active power absorbed by the simulated GSC is restrained to 0.47 pu. Since the simulated DFIG is able to maintain normal generation, the voltage dips do not cause significant variations on the rotor speed and rotor current, as shown in FIG. 12 graphs (h) and (i).

Figure 13:
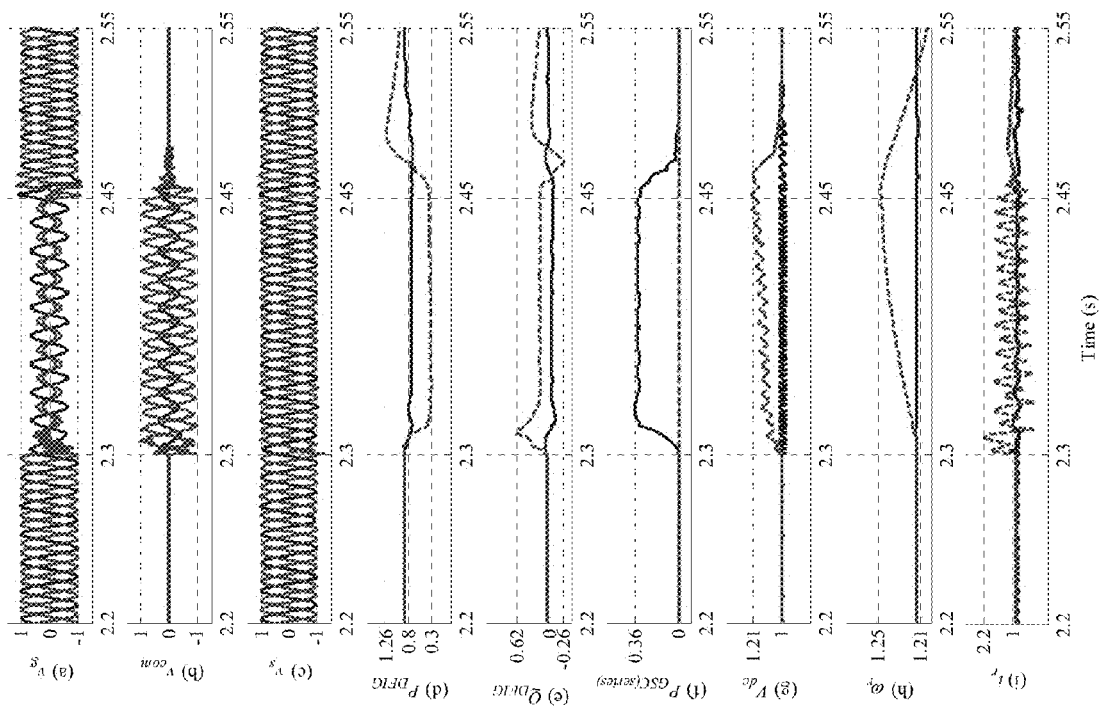
FIG. 13 illustrates various example simulation results of a series compensation topology compared with the case without a protection scheme during a double-line-to-ground-fault consistent with the present disclosure.

An example system response to a double-line-to-ground fault at the PCC is illustrated in graphs (a) to (i) of FIG. 13. The compensation scheme, consistent with the present disclosure, maintains normal system operation and injects the desired series voltage to maintain constant voltage at the stator terminals of the simulated DFIG, as shown in FIG. 13 graph (c). Other important measurements of the active power, reactive power, dc-link voltage, generator speed, and rotor current are evaluated as shown in FIG. 13 graphs (d), (e), (g), (h), and (i), respectively.

Figure 14:
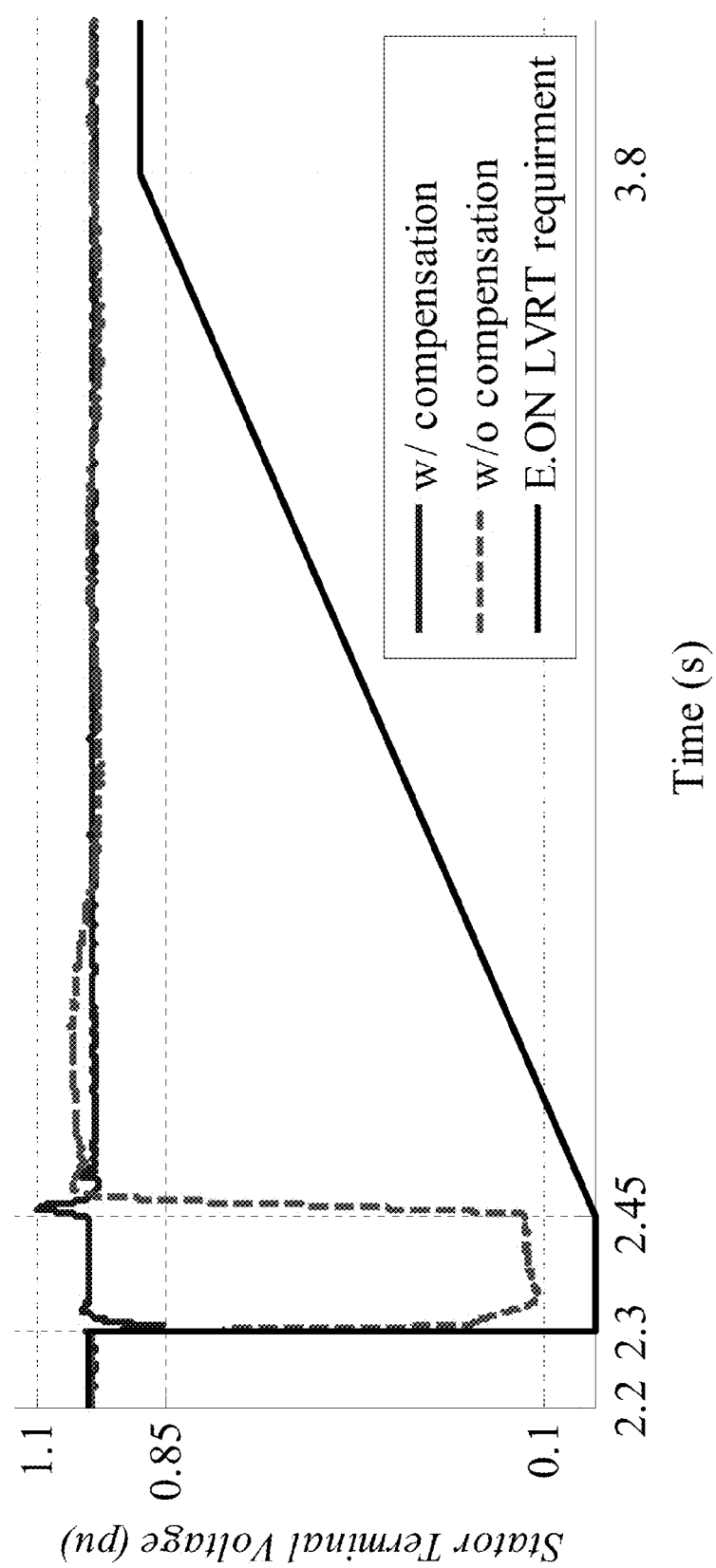
FIG. 14 illustrates an example of voltage variation at the stator terminal during a fault consistent with the present disclosure.
Figure 15:
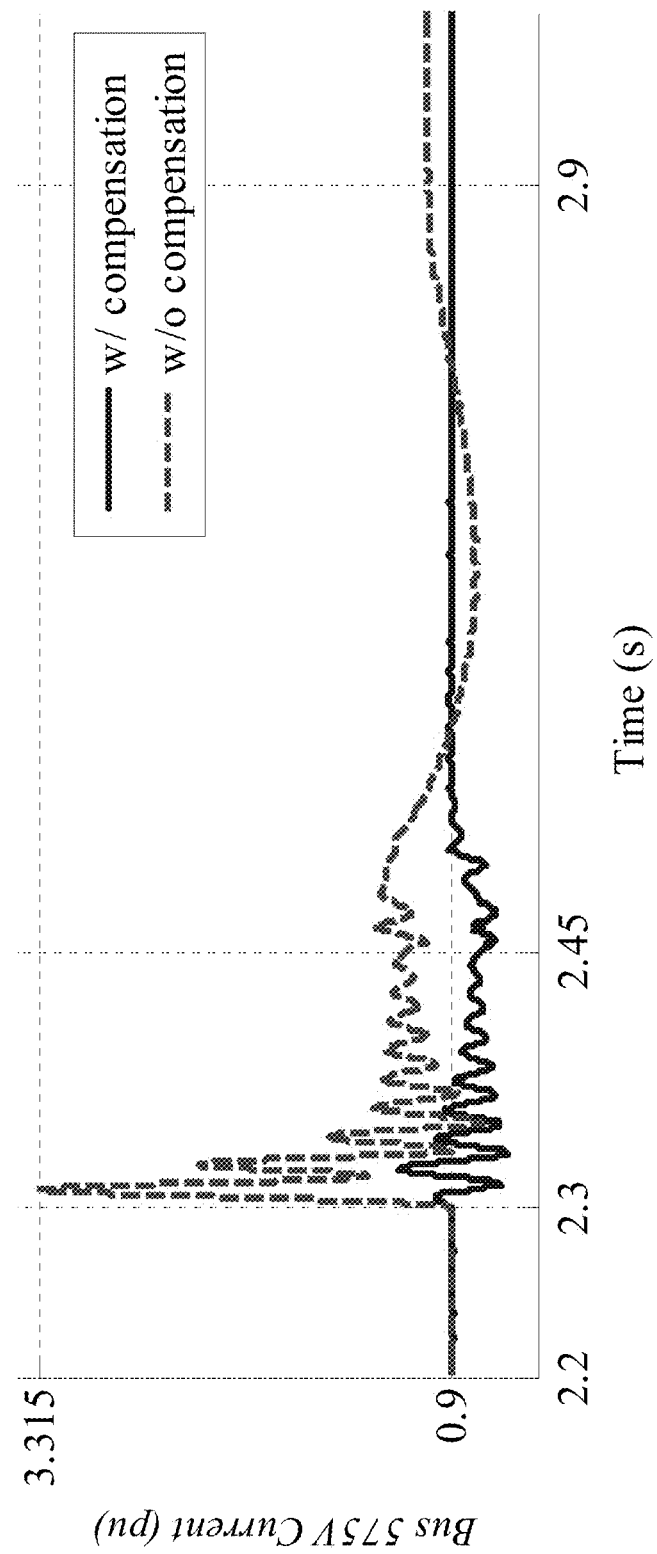
FIG. 15 illustrates an example current variation at bus 575V during a fault consistent with the present disclosure.
Figure 16:
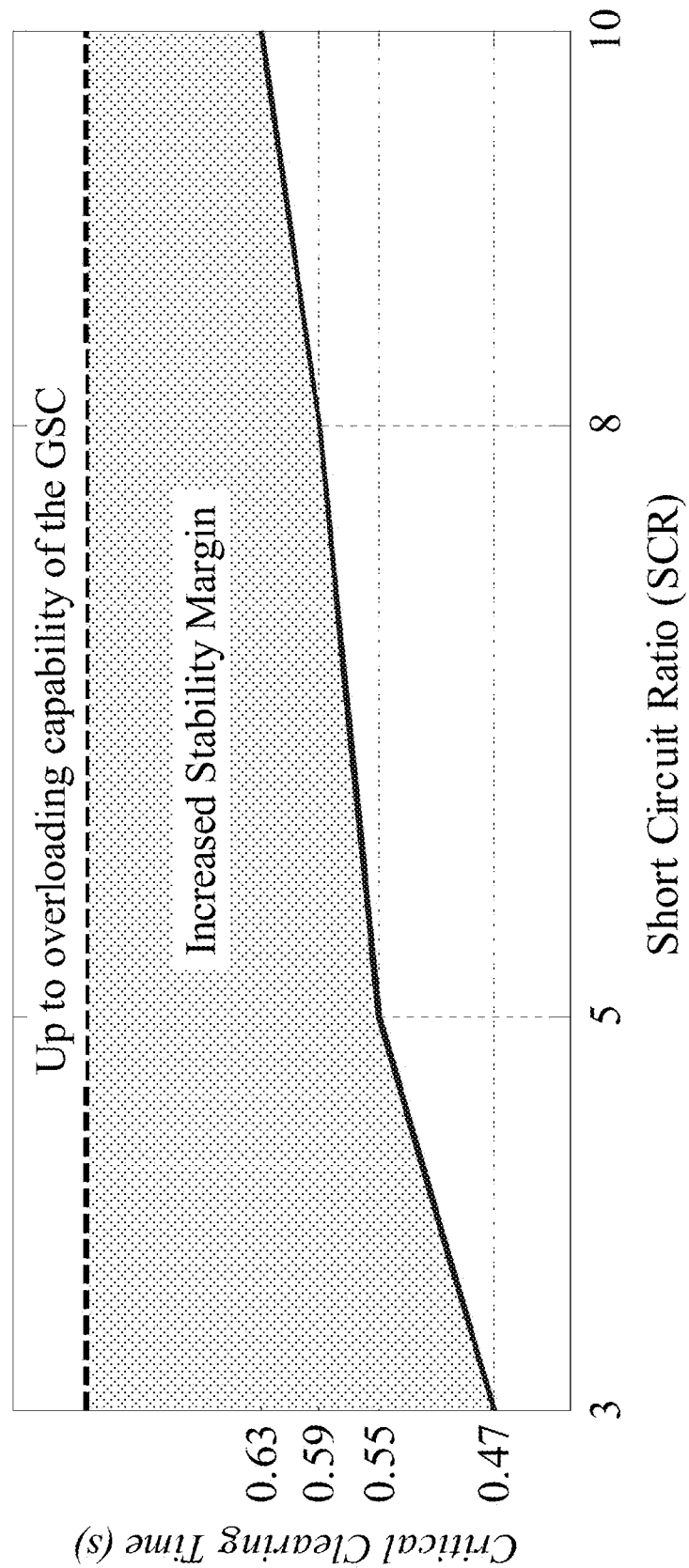
FIG. 16 illustrates an example critical clearing time of a wind farm connected to different short circuit ratio (SCR) grids consistent with the present disclosures.

Simulated variations of the terminal voltage at the stator terminal with and without series compensation consistent with the present disclosure are illustrated in FIG. 14, wherein a dip happens at 2.3 s and is cleared at 2.45 s. FIG. 15 illustrates a significant reduction of short circuit current from a DFIG wind turbine employing a fault ride-through configuration and transient management scheme consistent with the present disclosure. FIG. 16 illustrates critical clearing time for a wind farm connected to an external grid with various short-circuit ratios. Since a DFIG may maintain normal operation during faults, its output may assist in stabilizing the system after clearing the fault. The critical clearing time may be increased to the overloading capability of the GSC. An improvement may be seen in that series compensation consistent with the present disclosure may enhance the stability margin and support system recovery after faults.

Figure 17:
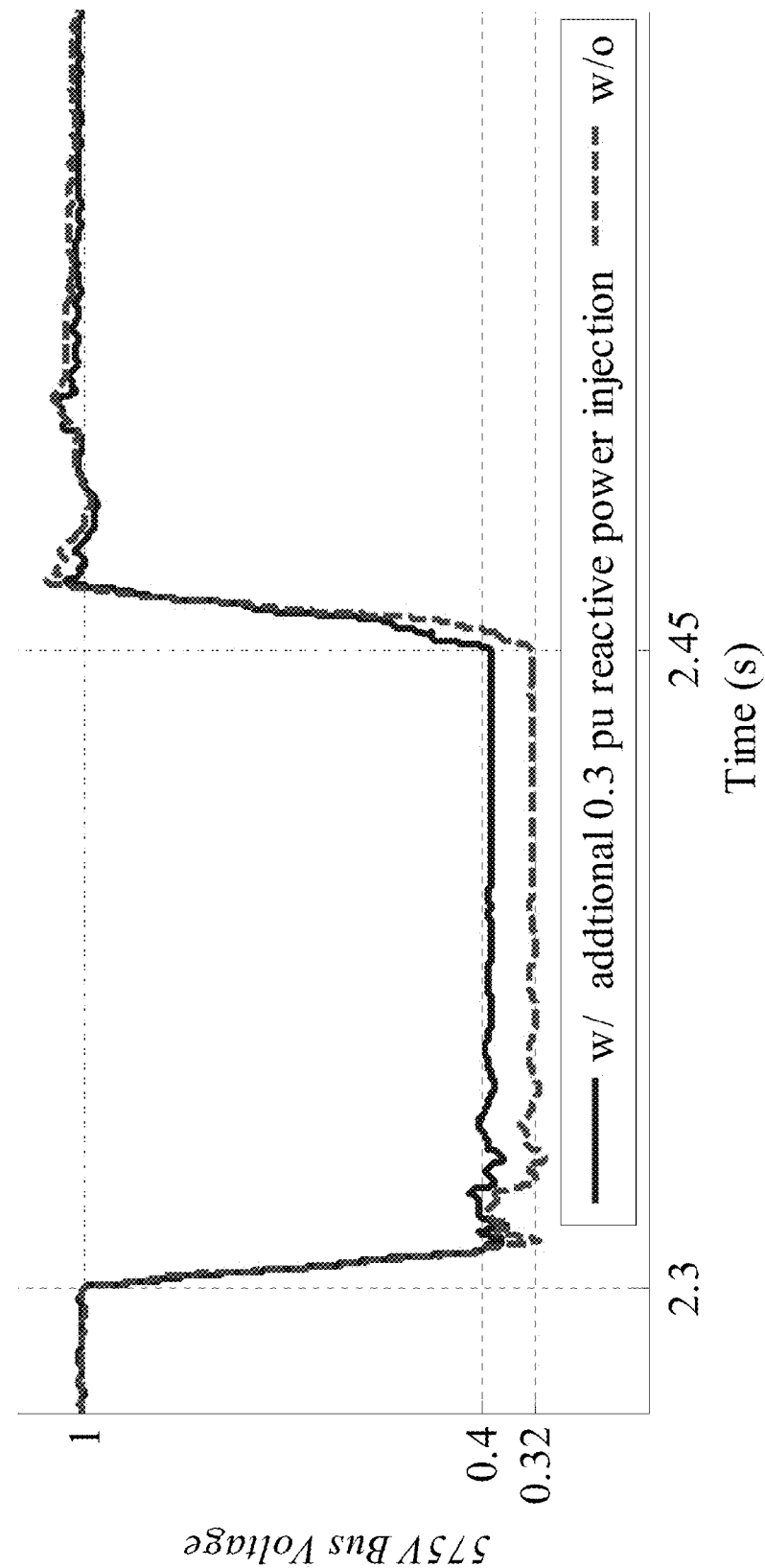
FIG. 17 illustrates an example voltage magnitude at bus 575V with additional reactive power compensation consistent with the present disclosure.

Moreover, in the case that a wind farm is connected to a weak power system, a DFIG may be controlled to supply reactive power, assisting in recovering the terminal voltage as grid code suggests. In simulated example of FIG. 17 it may be observed that the wind farm terminal voltage is lifted to a higher level with additional reactive power injection.

FRT configuration and transient management schemes, such as disclosed herein, may greatly enhance the FRT capability for DFIG wind turbines. A series compensation strategy may be employed to maintain stator voltage in response to balanced and unbalanced voltage dips. As a result, severe overcurrent and overvoltage in the stator and rotor circuits may be prevented. The various embodiments, as disclosed herein, do not require dedicated converter or crowbar circuits. A transient management scheme may be utilized to evaluate transient conditions and coordinate operation of a braking resistor, switches and shunt or series compensation. The braking resistor may alleviate the current transient that would result from a fault and ensures smooth transition between the shunt and series topologies. Symmetrical and asymmetrical grid faults may be addressed by controlling positive and negative sequence voltages in the dq reference frame. Linearized models may characterize the system dynamics for different operating conditions. Consequently, controllers may be precisely tuned to achieve the desired performance and system robustness. FRT configuration and transient management schemes consistent with the present disclosure may significantly improve the transient stability margin at different SCRs, as well as minimize the contribution of short circuit current from the DFIG. A cost-effective solution also results due to reducing the required interruption capacity of the installed circuit breakers.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, a "circuit" or "circuitry" may comprise, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Thus, the present disclosure provides systems and methods for fault handing for a doubly fed induction generator. A Fault Ride Through (FRT) transient management system to enhance the FRT capability of wind turbines employing doubly-fed induction generators (DFIG). A grid side converter (GSC) introduces shunt and series compensation for normal operation and voltage dips, respectively. A braking resistor may be added to smooth switching transients from shunt to series interfaces and dissipate excessive power from the GSC. To attain a flexible control solution for balanced and unbalanced fault conditions, the transient management scheme may employ positive and negative sequence controllers. The system dynamics for the series compensation topology may be analyzed using small-signal linear model. Based on the mathematical model, the controller may be tuned to balance voltage regulation performance and transient stability margins with consideration of various operating conditions. The system benefits from a low component count, simple protection structure, and improved FRT performance with effective compensation to the electric grid.

The present disclosure is not limited to only the embodiments discussed above. For example, according to one aspect there is provided a system. The system may include a doubly fed induction generator (DFIG) comprising a rotor and a stator coupled to an electrical grid, the DFIG being configured to generate power for the electrical grid, rotor-side converter (RSC) circuitry coupled to at least the rotor, the RSC circuitry being configured to control the power generation on the rotor side of the DFIG, grid-side converter (GSC) circuitry coupled to at least the electrical grid, the GSC being configured to control the power generation on the grid side of the DFIG, and fault handling circuitry coupled to at least the GSC, the fault handling circuitry being configured to convert the system from a shunt connection configuration to a series compensation configuration on the occurrence of a fault.

The above example system may be further configured, wherein the fault handling circuitry comprises at least three switches and a transformer, the at least three switches being configured to connect the transformer in series with the GSC circuitry in the series compensation configuration. In this configuration, the example system may be further configured, wherein the fault handling circuitry further comprises an LC filter and braking resistor in series between the GSC and the transformer, the braking resistor being configured to be optionally engaged to dissipate overload power.

The above example system may be further configured, wherein the fault handling circuitry comprises at least fault detection circuitry and at least one phase-locked loop (PLL) controller, the fault detection circuitry and the at least one PLL controller being configured to cause the system to convert from the shunt connection configuration to the series compensation configuration when the fault detection circuitry detects a fault.

The above example system may be further configured, wherein the fault handling circuitry is further configured to cause the GSC controller to convert from a shunt control scheme to a series control scheme in accordance with the system converting from a shunt connection configuration to a series compensation configuration.

The above example system may be further configured, wherein the rotor of the DFIG is mechanically coupled to a wind turbine through a mechanical gear box.

According to another aspect there is provided a method. The method may include monitoring a voltage an electrical grid, determining stator power and rotor speed of a doubly fed induction generator (DFIG) coupled to the electrical grid based on the monitoring of the grid voltage, and engaging fault handling circuitry based at least on the monitored stator power.

The above example method may be further configured, wherein the stator power and rotor speed are determined when the grid voltage is monitored to drop below a certain level.

The above example method may be further configured, wherein engaging the fault handling circuitry comprises actuating switches in the fault handling circuitry to convert from a shunt connection configuration to a series compensation configuration.

The above example method may be further configured, wherein engaging the fault handling circuitry comprises determining whether to engage a braking resistor. In this configuration the method may be further configured, wherein the braking resistor is engaged when the stator power is above a certain level and rotor slip is less than zero.

The above example method may be further configured, wherein engaging the fault handling circuitry comprises causing a grid-side controller (GSC) to convert from a shunt control scheme to a series control scheme.

According to another aspect there is provided a system including at least one machine-readable storage medium. The machine-readable storage medium having stored thereon, individually or in combination, instructions that when executed by one or more processors result in the following operations comprising monitoring a voltage an electrical grid, determining stator power and rotor speed of a doubly fed induction generator (DFIG) coupled to the electrical grid based on the monitoring of the grid voltage, and engaging fault handling circuitry based at least on the monitored stator power.

The above example system may be further configured, wherein the stator power and rotor speed are determined when the grid voltage is monitored to drop below a certain level.

The above example system may be further configured, wherein engaging the fault handling circuitry comprises actuating switches in the fault handling circuitry to convert from a shunt connection configuration to a series compensation configuration.

The above example system may be further configured, wherein engaging the fault handling circuitry comprises determining whether to engage a braking resistor. In this configuration the example system may be further configured, wherein the braking resistor is engaged when the stator power is above a certain level and rotor slip is less than zero.

The above example system may be further configured, wherein engaging the fault handling circuitry comprises causing a grid-side controller (GSC) to convert from a shunt control scheme to a series control scheme.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed:

1. A system, comprising:
    a doubly fed induction generator (DFIG) comprising a rotor and a stator coupled to an electrical grid, the DFIG being configured to generate power for the electrical grid;
    grid-side converter (GSC) circuitry coupled to at least the electrical grid, the GSC being configured to control the power generation on the grid side of the DFIG; and
    fault handling circuitry coupled to at least the GSC, the fault handling circuitry being configured to convert the system from a shunt connection configuration to a series compensation configuration on the occurrence of a fault, wherein the fault handling circuitry includes at least three switches and a transformer, the at least three switches being configured to connect the transformer in series with the GSC circuitry in the series compensation configuration.

2. The system according to claim 1, wherein the fault handling circuitry further comprises an LC filter and braking resistor in series between the GSC and the transformer, the braking resistor being configured to be optionally engaged to dissipate overload power.

3. The system according to claim 1, wherein the fault handling circuitry comprises at least fault detection circuitry and at least one phase-locked loop (PLL) controller, the fault detection circuitry and the at least one PLL controller being configured to cause the system to convert from the shunt connection configuration to the series compensation configuration when the fault detection circuitry detects a fault.

4. The system according to claim 1, wherein the fault handling circuitry is further configured to cause the GSC controller to convert from a shunt control scheme to a series control scheme in accordance with the system converting from a shunt connection configuration to a series compensation configuration.

5. The system according to claim 1, wherein the rotor of the DFIG is mechanically coupled to a wind turbine through a mechanical gear box.

6. The system according to claim 1, further comprising a rotor-side converter (RSC) circuitry coupled to at least the rotor, the RSC circuitry being configured to control the power generation on the rotor side of the DFIG.

7. A method, comprising:
monitoring a voltage of an electrical grid;
determining stator power and rotor speed of a doubly fed induction generator (DFIG) coupled to the electrical grid based on the monitoring of the grid voltage; and
engaging fault handling circuitry based at least on the monitored stator power, wherein the fault handling circuitry includes at least three switches and a transformer, the at least three switches being configured to connect the transformer in series with grid-side converter (GSC) circuitry in a series compensation configuration.

8. The method according to claim 7, wherein the stator power and rotor speed are determined when the grid voltage is monitored to drop below a certain level.

9. The method according to claim 7, wherein engaging the fault handling circuitry comprises converting from a shunt connection configuration to a series compensation configuration.

10. The method according to claim 7, wherein engaging the fault handling circuitry comprises determining whether to engage a braking resistor.

11. The method according to claim 10, wherein the braking resistor is engaged when the stator power is above a certain level and rotor slip is less than zero.

12. The system according to claim 7, wherein engaging the fault handling circuitry comprises causing the grid-side converter (GSC) circuitry to convert from a shunt control scheme to a series control scheme.

13. A system comprising at least one non-transitory machine-readable storage medium having stored thereon, individually or in combination, instructions that when executed by one or more processors result in the following operations comprising:
monitoring a voltage of an electrical grid;
determining stator power and rotor speed of a doubly fed induction generator (DFIG) coupled to the electrical grid based on the monitoring of the grid voltage; and
engaging fault handling circuitry based at least on the monitored stator power, wherein the fault handling circuitry includes at least three switches and a transformer, the at least three switches being configured to connect the transformer in series with grid-side converter (GSC) circuitry in a series compensation configuration.

14. The system according to claim 13, wherein the stator power and rotor speed are determined when the grid voltage is monitored to drop below a certain level.

15. The system according to claim 13, wherein engaging the fault handling circuitry comprises converting from a shunt connection configuration to a series compensation configuration.

16. The system according to claim 13, wherein engaging the fault handling circuitry comprises determining whether to engage a braking resistor.

17. The system according to claim 16, wherein the braking resistor is engaged when the stator power is above a certain level and rotor slip is less than zero.

18. The system according to claim 13, wherein engaging the fault handling circuitry comprises causing the grid-side converter (GSC) circuitry to convert from a shunt control scheme to a series control scheme.

* * * * *